W. W. Chipman,
Manuf. of Whiting and Paris-White.
Nº 75,861.  Patented Mar. 24, 1868.
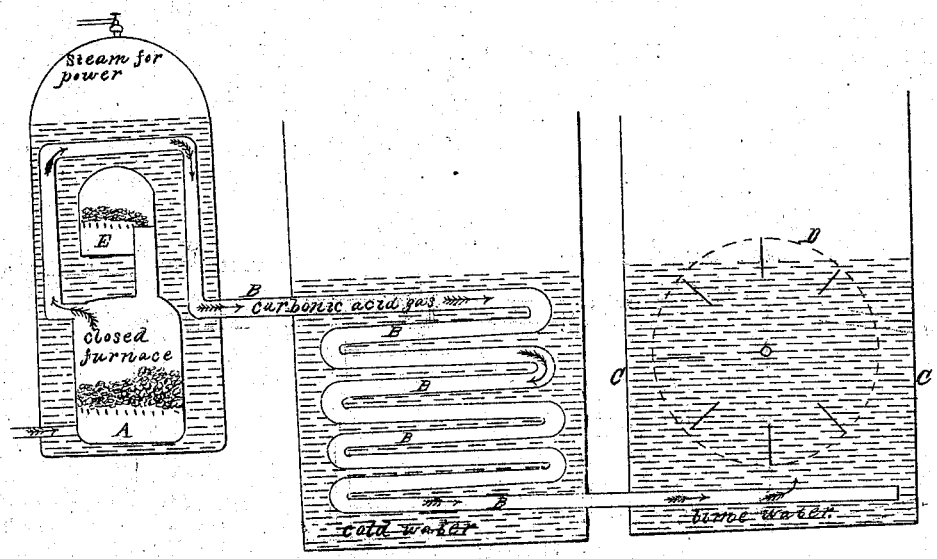
WITNESSES.  INVENTOR.

United States Patent Office.

WILLIAM W. CHIPMAN, OF BROOKLYN, NEW YORK, ASSIGNOR TO HIMSELF AND W. D. GOOKIN, OF NEW YORK CITY.

*Letters Patent No. 75,861, dated March 24, 1868.*

IMPROVEMENT IN THE MANUFACTURE OF WHITING AND PARIS-WHITE.

*The Schedule referred to in these Letters Patent and making part of the same.*

TO ALL WHOM IT MAY CONCERN:

Be it known that I, WILLIAM W. CHIPMAN, of Brooklyn, in the county of Kings, and State of New York, have invented certain new and useful Improvements in the Manufacture of Whiting and Paris-White; and I do hereby declare that the following is a full and exact description thereof.

My invention allows the manufacture of a purer article than usual, and at less expense.

I will first proceed to describe what I consider the best means of carrying out my invention, and will afterwards designate the point which I believe to be new therein.

I take good limestone, (carbonate of lime,) by preference that from the quarry at Missisquoi, in the State of Vermont, though I believe any good lime will serve about as well, and burn it in a kiln in the ordinary manner. I then slack the quick-lime thus produced, and add so much water, (I have used the Cochituate water at Boston,) in my experiments, as will form a thick fluid, having a consistency about like cream. I now let this stand for several hours, to allow all the foreign and gritty matter to subside. I then lead it into a tank, and blow up through it carbonic-acid gas, for some days or weeks, constantly agitating it by a wheel, after the fashion of a dairy-churn, until the water ceases to give any appreciable alkaline reaction to the taste. The particles of lime are now again fully supplied with carbonic acid, and are then carbonate of lime, substantially the same article, chemically, as while it lay in the form of rock in the earth, but exceedingly comminuted and void of foreign matter. It remains now to dry the mass by ordinary means, and the result is a whiting or Paris-white, made without grinding, yet as fine as the act of dissolving in water can make it.

This may be used for all the purposes for which ordinary whiting or Paris-white is used, with the same or a better effect.

The accompanying figure represents an outline or sketch of the apparatus which I propose to employ in the manufacture.

I may remark, that in my experiments, I have used carbonic-acid gas made by ordinary chemical means, treating marble-dust with sulphuric acid, and have realized only such degree of heat in my agitating-vessel as is due to the chemical action, but I believe that the means sketched will be found equivalent in practice.

A is a closed furnace, in which anthracite is burned slowly, the early gaseous emissions having been allowed to escape freely into the atmosphere. The later gases, composed largely of carbonic acid, are cooled by the presence of water, either by conducting them through a long pipe or series of pipes, B, or, if preferred, by blowing them up through water, and finally blown up at a reasonably reduced temperature through the agitated lime-water in the vessel C. I have represented the agitator by D. It may be turned by a belt or gearing from a steam-engine, the heat from which may be derived from the gases in the process of cooling before referred to. The same steam-engine, not represented, by means of a suitable pump or powerful blower, may force in the continual supply of fresh air required to maintain the combustion and supply the constant current of gases. The coal may be added to the fire through a double door or lock, after being partially burned in another chamber, E.

Some of the benefits of my invention may be obtained by slaking the lime to a powder, instead of its being suspended in water, and the carbonic acid gas may be applied while in that powdery state, but I much prefer the suspension in water, as described.

Having now fully described my invention, what I claim as new therein, and desire to secure by Letters Patent, is as follows:

I claim the within-described process of manufacturing Paris-white and whiting from limestone, by the three several steps of burning, slaking, and recarbonizing, substantially as and for the purposes herein set forth.

In testimony whereof, I have hereunto set my name in presence of two subscribing witnesses.

W. W. CHIPMAN.

Witnesses:
W. C. DEY,
THOMAS D. STETSON.